(12) United States Patent
Kim et al.

(10) Patent No.: US 7,563,160 B2
(45) Date of Patent: Jul. 21, 2009

(54) VENTILATING APPARATUS

(75) Inventors: Kyung Hwan Kim, Uiwang-si (KR); Jeong Yong Kim, Seoul (KR); Ho Seon Choi, Seoul (KR); Gi Seop Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 11/291,773

(22) Filed: Dec. 2, 2005

(65) Prior Publication Data

US 2006/0199516 A1 Sep. 7, 2006

(30) Foreign Application Priority Data

Feb. 15, 2005 (KR) .................. 10-2005-0012359

(51) Int. Cl.
*F24F 12/00* (2006.01)
*F24F 7/06* (2006.01)
*F24F 13/20* (2006.01)

(52) U.S. Cl. .................. 454/249; 454/237; 454/241; 454/251; 454/252; 165/54

(58) Field of Classification Search .......... 454/237, 454/241, 244, 248, 251, 249, 252; 165/4, 165/54

See application file for complete search history.

(56) References Cited

U.S. PATENT DOCUMENTS

| | | | | |
|---|---|---|---|---|
| 4,367,636 A | * | 1/1983 | Sakuma et al. | 62/262 |
| 4,478,055 A | * | 10/1984 | Drucker | 62/324.1 |
| 4,817,708 A | * | 4/1989 | Ono et al. | 165/54 |
| 5,259,816 A | * | 11/1993 | Ke et al. | 454/244 |
| 6,619,063 B1 | * | 9/2003 | Brumett | 62/264 |
| 6,684,939 B2 | * | 2/2004 | Yeung | 165/54 |
| 2002/0023455 A1 | * | 2/2002 | Kosugi et al. | 62/285 |
| 2005/0269057 A1 | | 12/2005 | Lee et al. | |
| 2005/0287944 A1 | | 12/2005 | Choi et al. | |
| 2006/0199511 A1 | * | 9/2006 | Chung et al. | 454/237 |

FOREIGN PATENT DOCUMENTS

| | | |
|---|---|---|
| CN | 1409061 | 4/2003 |
| JP | 57031744 A * | 2/1982 |
| JP | 57 60131 | 4/1982 |

(Continued)

OTHER PUBLICATIONS

U.S. Appl. No. 11/121,948, filed May 5, 2005, Lee et al.

(Continued)

*Primary Examiner*—Steven B McAllister
*Assistant Examiner*—Patrick F. O'Reilly, III
(74) *Attorney, Agent, or Firm*—McKenna Long & Aldridge LLP (57) ABSTRACT

A ventilating apparatus is disclosed, by which an installation of the apparatus is conveniently facilitated. The present invention includes a blower device supplying an outdoor air to an indoor space and discharging an indoor air to an outdoor space, a heat exchange unit performing heat exchange between the outdoor air supplied to the indoor space and the indoor air discharged to the outdoor space, and a case having a first chamber receiving the heat exchange unit therein and a second chamber receiving the blower device therein to communicate with the first chamber.

15 Claims, 6 Drawing Sheets

FOREIGN PATENT DOCUMENTS

| | | | | |
|---|---|---|---|---|
| JP | 57060131 | A | * | 4/1982 |
| JP | 57073335 | A | * | 5/1982 |
| JP | 58179744 | A | * | 10/1983 |
| JP | 06313602 | A | * | 11/1994 |

OTHER PUBLICATIONS

U.S. Appl. No. 11/135,302, filed May 24, 2005, Lee et al.
U.S. Appl. No. 11/135,363, filed May 24, 2005, Lee et al.
English Language Abstract of CN 1409061.

* cited by examiner

FIG. 1

Related Art

VENTILATING APPARATUS

This application claims the benefit of the Korean Patent Application No. P2005-12359, filed on Feb. 15, 2005.

BACKGROUND OF THE INVENTION

1. Field of the Invention

The present invention relates to a ventilating apparatus for ventilation. Although the present invention is suitable for a wide scope of applications, it is particularly suitable for convenient installation on a ceiling and the like.

2. Discussion of the Related Art

Generally, a user naturally ventilates a room by opening an opening/closing part such as a window that allows an indoor space to communicate with an outdoor environment or by actuating a separate ventilator, thereby maintaining a pleasant indoor environment.

In case of ventilating a room by natural ventilation, a considerable amount of dust is introduced into the room via the window. Specifically, rain is introduced into the room on a rainy day.

So, a ventilator, which forcibly discharges an indoor air to the outdoor environment by driving a blower and forcibly supplies an outdoor air to the room, has been used.

A ventilator according to a related art is explained with reference to FIG. 1 as follows.

Figure 1:
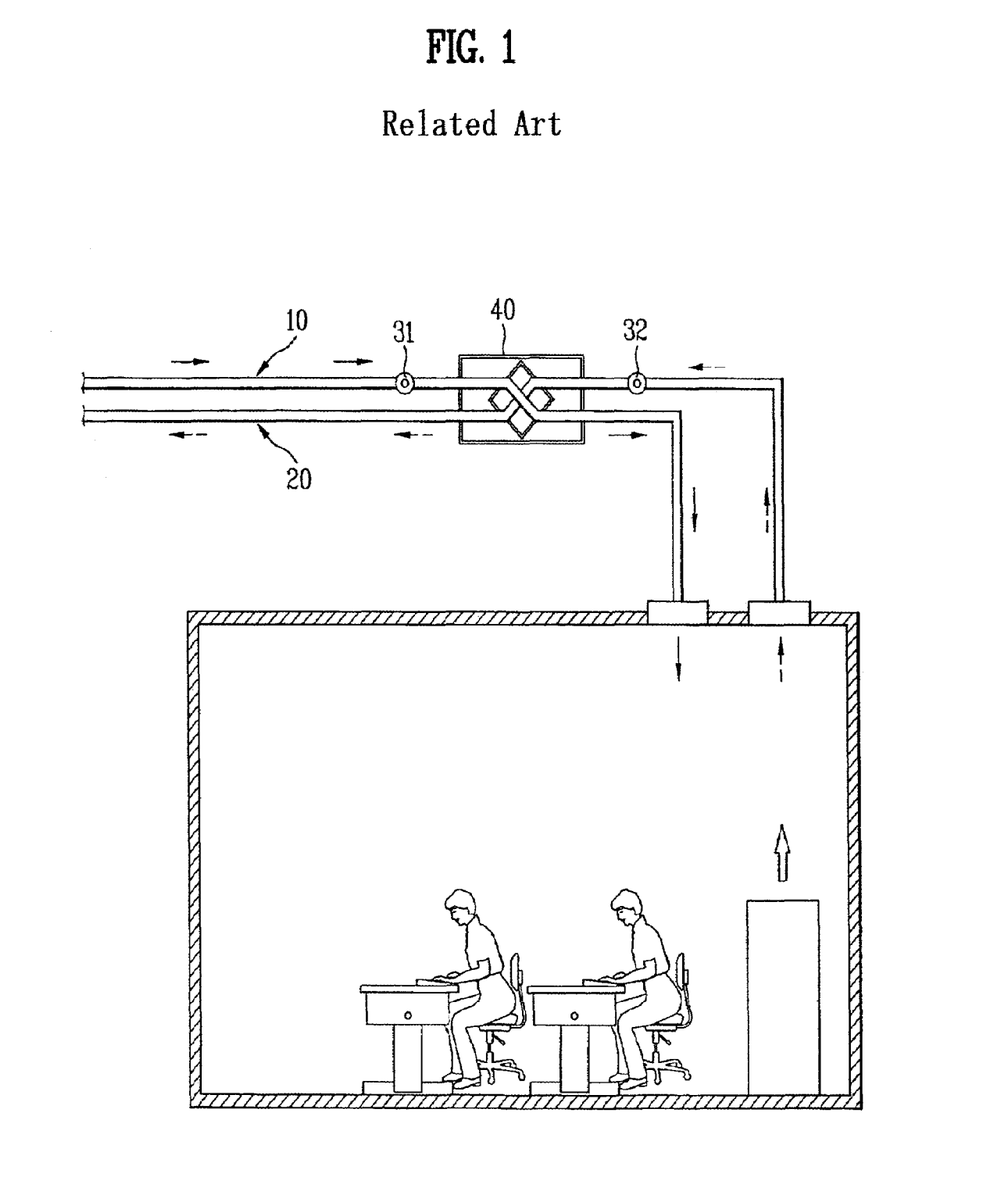
FIG. 1 is a cross-sectional diagram of a ventilator according to a related art.

Referring to FIG. 1, a ventilator according to a related art consists of an inlet duct 10 provided within a ceiling of a room, an outlet duct 20 provided within the ceiling of the room, an inlet fan 31 provided to the inlet duct 10, and an outlet fan 32 provided to the outlet duct 20.

In this case, the inlet duct 10 guides an outdoor air to an indoor space and the outlet duct 20 guides an indoor air to an outdoor space.

The inlet and outlet ducts 10 and 20 are installed to cross with each other at a specific location to which a heat exchange unit 40 is provided to make mutual heat exchange between the outdoor air supplied to the indoor space and the indoor air discharged to the outdoor space.

The heat exchange unit 40 has a long hexahedral shape having a long vertical length to improve a heat exchange rate. And, rotational axes of the inlet and outlet fans 31 and 32 are aligned in the same length directions of the inlet and outlet ducts 10 and 20, respectively.

However, the heat exchange unit 40 of the related art ventilator needs to be separately installed at the intersection between the inlet and outlet ducts 10 and 20. And, the inlet and outlet fans 31 and 32 should be installed at the inlet and outlet ducts 10 and 20, respectively. Hence, an installation work of the ventilator for room ventilation is difficult.

And, the related art ventilator needs an excessive space for its installation on the ceiling of the room due to the configurations of the heat exchange unit and the inlet and outlet fans. The related art ventilator requires a high installation cost.

Moreover, in case of providing a filter for the purification of the air supplied to the room, it is difficult for the related art ventilator to secure sufficient airflow.

Furthermore, a demand for a ventilator, which can be conveniently installed and can minimize a thickness of ceiling, is recently raised.

SUMMARY OF THE INVENTION

Accordingly, the present invention is directed to a ventilating apparatus that substantially obviates one or more problems due to limitations and disadvantages of the related art.

An object of the present invention is to provide a ventilating apparatus, by which an installation of the apparatus is conveniently facilitated.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, a ventilating apparatus according to the present invention includes a blower device supplying an outdoor air to an indoor space and discharging an indoor air to an outdoor space, a heat exchange unit performing heat exchange between the outdoor air supplied to the indoor space and the indoor air discharged to the outdoor space, and a case having a first chamber receiving the heat exchange unit therein and a second chamber receiving the blower device therein to communicate with the first chamber.

Preferably, the case has a flat rectangular box shape that is thin and wide.

More preferably, a thickness of the case is substantially equal to or smaller than 100 mm.

Preferably, the case includes a first intake port via which the outdoor air is introduced, a second intake port via which the indoor air is introduced, an inlet for supplying the outdoor air to the indoor space, and an outlet for discharging the indoor air.

More preferably, the first intake port and the outlet are configured to penetrate a sidewall of the first chamber and the second intake port and the inlet are configured to penetrate a bottom of the second chamber.

More preferably, the first and second chambers are partitioned from each other by a boundary wall traversing an inside of the case.

More preferably, the blower device includes an inlet fan supplying the outdoor air to the indoor space and an outlet fan discharging the indoor air to the outdoor space.

More preferably, each of the inlet and outlet fans comprises a turbo fan.

More preferably, each of the inlet and outlet fans is rotated centering on a rotational shaft vertical to a bottom of the case.

More preferably, the rotational shafts of the inlet and outlet fans are provided to a coaxial line to be rotated by one motor.

More preferably, the inlet fan is provided over the outlet fan.

More preferably, the second chamber includes an inlet fan receiving portion receiving the inlet fan therein and an outlet fan receiving portion receiving the outlet fan therein.

More preferably, the boundary wall includes a first communicating opening for blowing the indoor air from the outlet fan receiving portion to the heat exchange unit and a second communicating opening for sucking the outdoor air into the inlet fan receiving portion from the heat exchange unit.

More preferably, the heat exchange unit includes a first passage via which the indoor air discharged to the outdoor space passes and a second passage provided parallel to a bottom of the case, the second passage via which the outdoor air supplied to the indoor space passes, the second passage guiding the air in a direction substantially vertical to an airflow direction of the first passage.

More preferably, the ventilating apparatus further includes a filter unit provided within the case to filter off particles included in the outdoor air supplied to the indoor space.

More preferably, the filter unit is provided to an intake side of the second passage.

More preferably, the filter unit includes a HEPA filter.

More preferably, the inlet fan receiving portion is provided over the outlet fan receiving portion, the first communicating opening is provided to a lower part of one side of the boundary wall, and the second communicating opening is provided to an upper part of the other side of the boundary wall.

More preferably, an inlet fan intake portion is provided to a central part of an upper side of the inlet fan receiving portion and the second intake port is provided to a central part of a bottom of the outlet fan receiving portion.

More preferably, a space having a predetermined size is provided between the upper side of the inlet fan receiving portion and a ceiling of the second chamber to communicate with the second communicating opening.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A ventilating apparatus according to one embodiment of the present invention is explained with reference to FIGS. 2 to 5 as follows.

Figure 2:
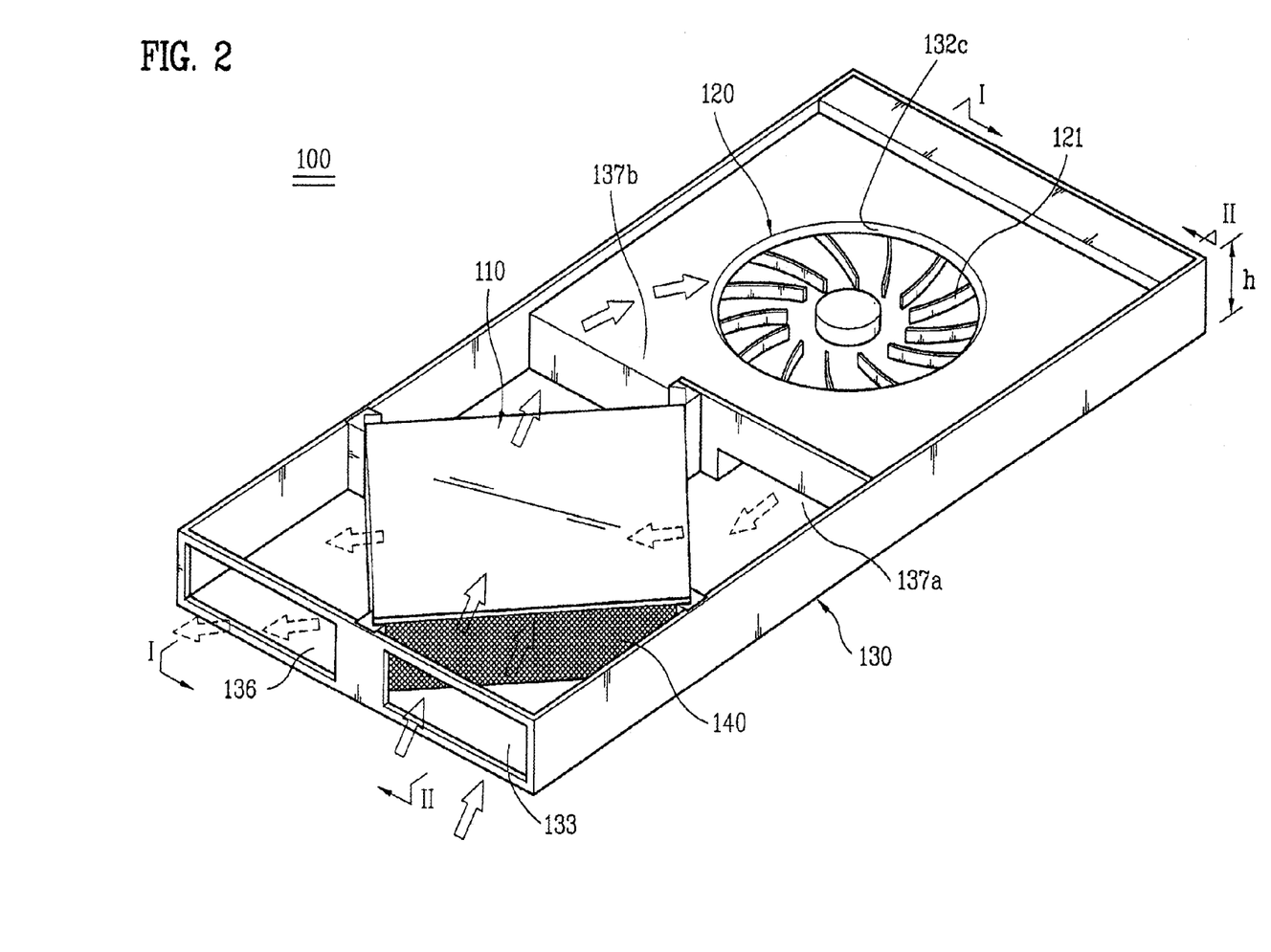
FIG. 2 is a perspective diagram of a ventilating apparatus according to one embodiment of the present invention.
Figure 3:
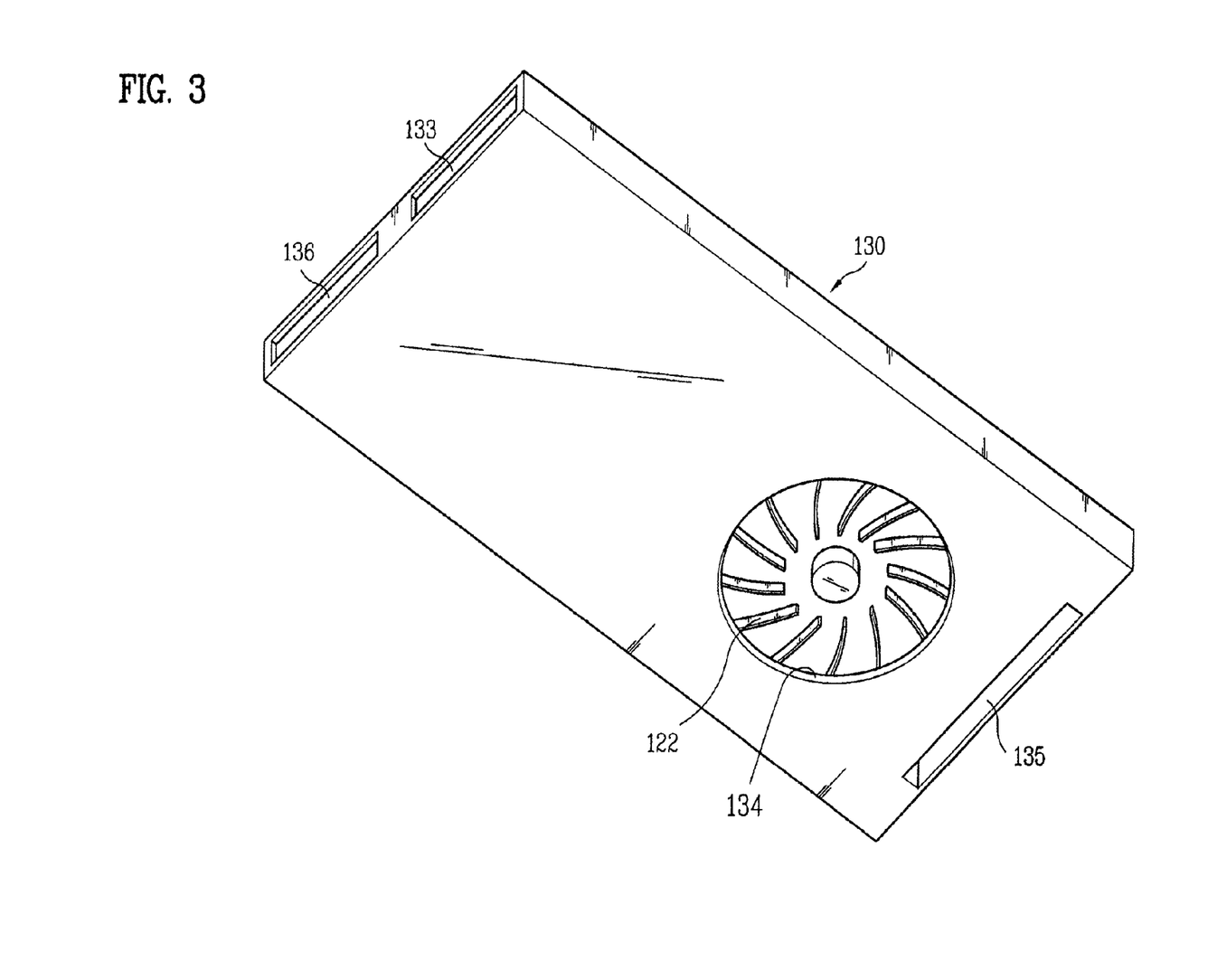
FIG. 3 is a perspective diagram of the ventilating apparatus in FIG. 2, in which a bottom side is shown.
Figure 4:
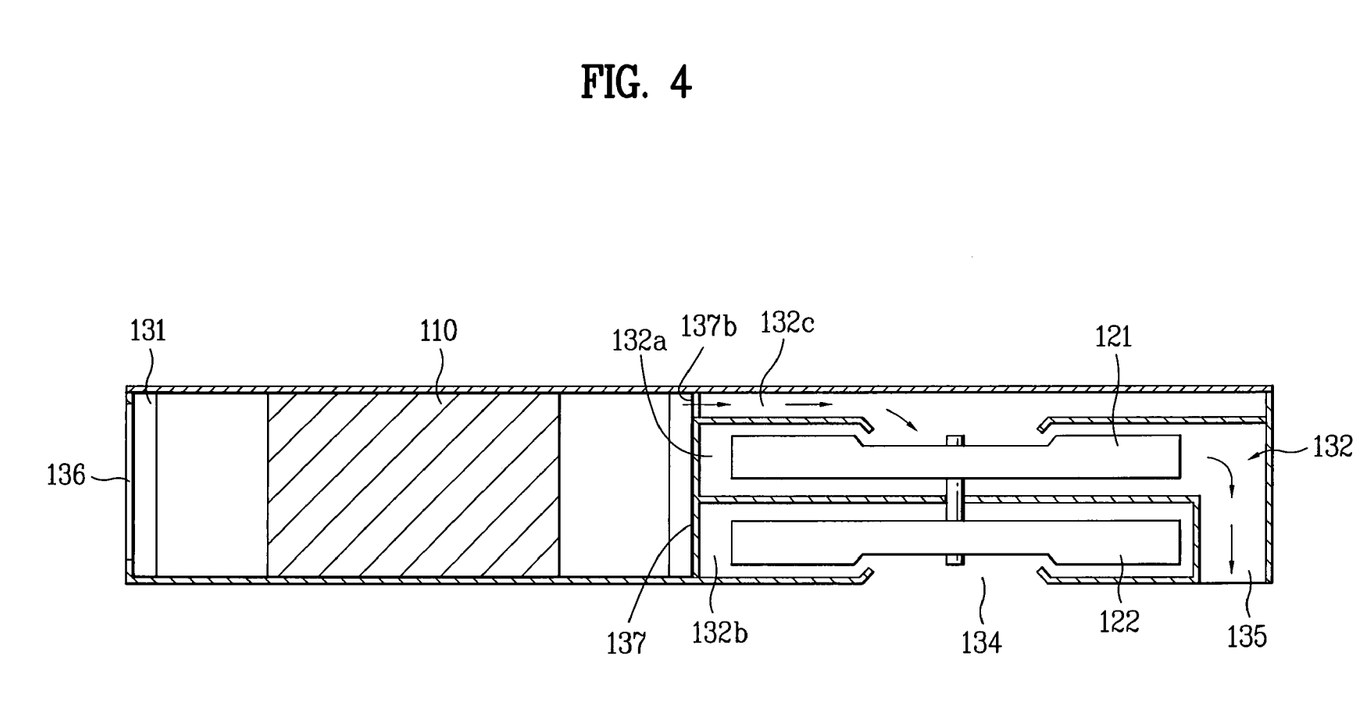
FIG. 4 is a cross-sectional diagram taken along a cutting line I-I in FIG. 2.
Figure 5:
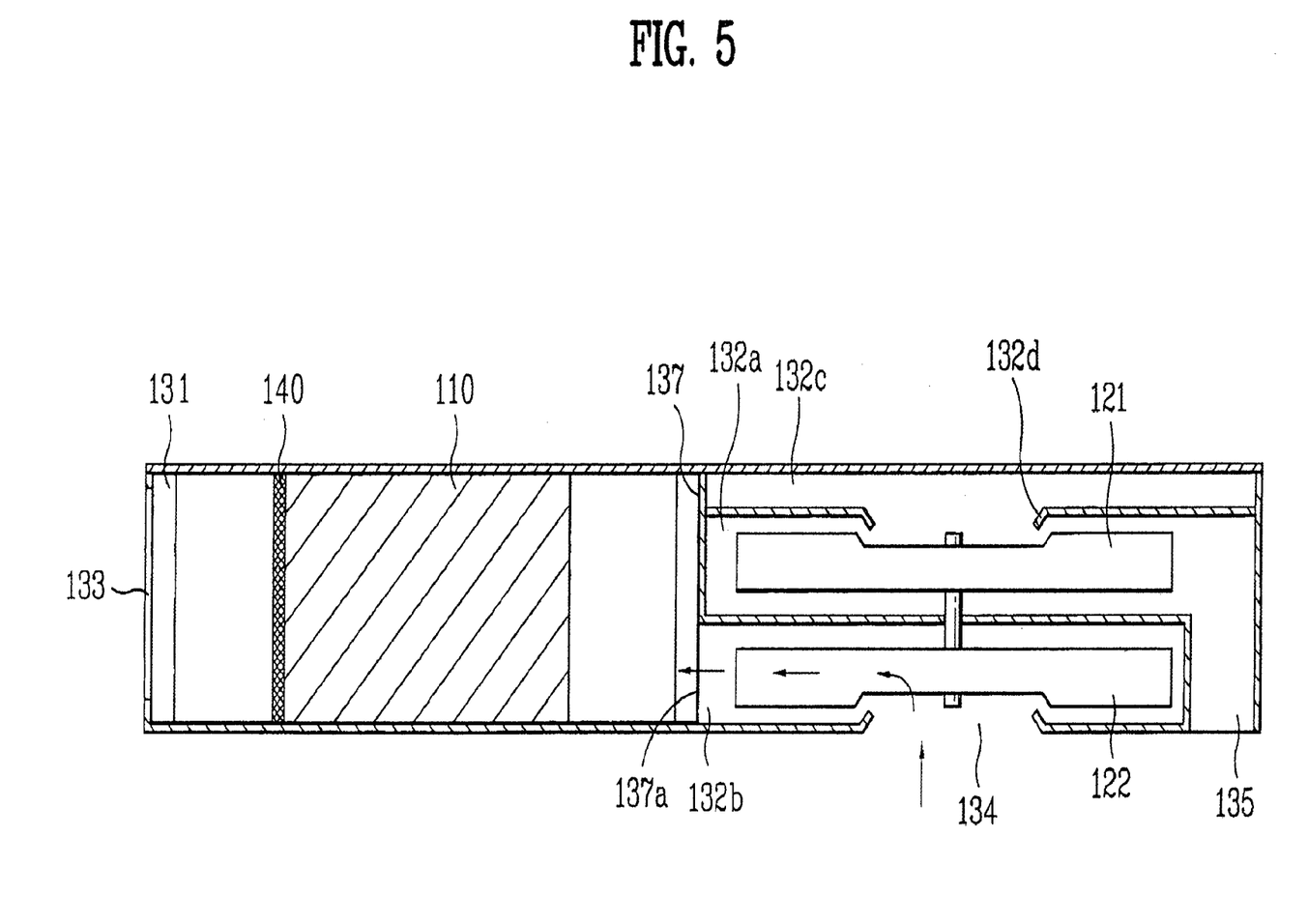
FIG. 5 is a cross-sectional diagram taken along a cutting line II-II in FIG. 2.

FIG. 2 is a perspective diagram of a ventilating apparatus according to one embodiment of the present invention, FIG. 3 is a perspective diagram of the ventilating apparatus in FIG. 2, in which a bottom view is shown, FIG. 4 is a cross-sectional diagram taken along a cutting line I-I in FIG. 2, and FIG. 5 is a cross-sectional diagram taken along a cutting line II-II in FIG. 2.

Referring to FIG. 2 and FIG. 3, a ventilating apparatus according to one embodiment of the present invention includes a box type case 130, a heat exchange unit 110 provided within the case 130 to recover externally discharged heat, and a blower device 120 provided within the case 130 to force a flow of air for room ventilation.

The heat exchange unit 110 brings about mutual heat exchange between an outdoor air supplied to an indoor space and an indoor air discharged to an outdoor space to recover coldness discharged to the outdoor space in summer or warmth discharged to the outdoor space in winter, thereby preventing heat loss.

The blower device 120 is operative in supplying the outdoor air to the indoor space or discharging the indoor air to the outdoor space.

Provided within the case 130 are a first chamber 131 receiving the heat exchange unit 110 therein and a second chamber 132 receiving the blower device 120 therein.

In this case, the first and second chambers 131 and 132 are configured to communicate with each other.

Specifically, the case 130 preferably has a flat box type shape having a small thickness h and a great width. For reference, FIG. 2 shows the ventilating apparatus of which upper plate is removed to expose an internal configuration of the ventilating apparatus.

If the thickness of the case 130 is big, a thickness of a ceiling on which the case 130 will be built needs to be raised. So, by minimizing the thickness of the case 130, it is preferable to prevent the ceiling thickness from increasing.

In this case, the thickness of the case 130 is variable according to the thickness of the ceiling. Preferably, the thickness of the case 130 is substantially set to 100 mm or less.

Meanwhile, to prevent the airflow from decreasing due to the reduction of the thickness of the case 130, the width of the case 130 is formed wide to increase an internal space of the case 130.

Provided to the case 130 are a first intake port 133 via which an outdoor air is introduced, a second intake port 134 via which an indoor air is introduced, an inlet 135 supplying the outdoor air to an indoor space, and an outlet 136 discharging the indoor air.

Specifically, the first intake port 133 and the outlet 136 are formed parallel to each other to penetrate a sidewall of the first chamber 131 configuring one sidewall of the case 130.

For convenience of explanation, one sidewall having the first intake port 133 and the outlet 136 is named a front side of the case 130. And, the other sidewall opposing the front side of the case is named a backside.

The first intake port 133 and the outlet 136 are preferably provided to the sidewall of the first chamber in a width direction of the case 130. And, the first intake port 133 and the outlet 136 are provided to confront the second chamber 132 receiving the blower device 120 therein.

The first intake port 133 is connected to an inlet duct (not shown in the drawing) guiding the outdoor air to the case 130, while the outlet 136 is connected to an outlet duct (not shown in the drawing) guiding the indoor air discharged from the case 130 to the outdoor space.

The inlet and outlet ducts are installed to traverse an inside of the ceiling.

Alternatively, the first intake port 133 and the outlet 136 can be installed to be directly exposed to the outdoor space. p The second intake port 134 and the inlet 135 are provided to a sidewall of the second chamber 132, and more particularly, to a bottom of the second chamber 132 to penetrate. Alternatively, the second intake port 134 and the inlet 135 can be provided to other locations.

Although not shown in the drawings, the second intake port 134 and the inlet 135 can be configured to be opened/closed by dampers, respectively. Optionally, it is a matter of course that the first intake port 133 and the outlet 136 can be opened/closed by different dampers, respectively.

Once the blower device 120 is driven by the above configuration, the indoor air is introduced into the case 130 via the second intake port 134 and the outdoor air having passed through the heat exchange unit 110 is supplied to the indoor space via the inlet 135.

The heat exchange unit 110, as mentioned in the foregoing description, is received in the first chamber 131 and is configured to bring about the mutual heat exchange between the indoor air discharged to the outdoor space and the outdoor air supplied to the indoor space.

For this, the heat exchange unit 110 has a thin rectangular box shape.

In this case, to prevent the heat exchange performance degradation attributed to the reduction of airflow due to the thickness reduction of the heat exchange unit 110, i.e., to compensate for the reduced thickness of the heat exchange unit 110, the heat exchange unit 110 preferably has a wide rectangular box shape.

Within the heat exchange unit 110 provided are a first passage (not shown in the drawing) through which the indoor air passes to be discharged to the outdoor space and a second passage (not shown in the drawing) through which the indoor air passes to be supplied to the indoor space.

Specifically, the first passage and the second passage are alternately stacked within the heat exchange unit 110 in a vertical direction. And, a boundary between the first and second passages is preferably formed of a material having excellent thermal conductivity.

The first and second passages are provided in parallel to a bottom of the case 130 to guide the indoor air and the outdoor air in a direction parallel to the bottom of the case 130, respectively.

optionally, the second passage can be configured to guide the air in a direction substantially vertical to an airflow direction of the first passage. Alternatively, the second passage can be arbitrarily configured as well.

The above-configured heat exchange unit 110 is arranged within the first chamber to configure a lozenge shape so that a diagonal line of the heat exchange unit 110 is provided parallel to the sidewall of the first chamber 131 at which the first intake port 133 and the outlet 136 are formed, i.e., to the front side of the case 130.

Meanwhile, the blower device 120 includes an inlet fan 121 for supplying the outdoor air to the indoor space and an outlet fan 122 for discharging the indoor air to the outdoor space.

In this case, the first chamber 131 and the second chamber 132 are partitioned from each other by a boundary wall 137 traversing an inside of the case 130.

And, the second chamber 132 includes an inlet fan receiving portion 132a receiving the inlet fan 121 therein and an outlet fan receiving portion 132b receiving the outlet fan 122 therein.

To minimize the thickness of the case 130, each of the inlet and outlet fans 121 and 122 preferably includes a turbo fan rotating centering around a rotational shaft vertical to the bottom of the case 130, and more particularly, to a bottom of the second chamber 132. The reason is explained as follows.

Since passage resistance increases due to the reduction of the thickness of the case 130 and since the filter for air purification loses a pressure, a static pressure necessary for securing a proper airflow. So, the characteristics of the turbo fan are advantageous in raising the static pressure.

The turbo fan is configured to suck air in a axial direction and to blow the sucked air in a radial direction. Preferably, rotational shafts of the inlet and outlet fans 121 and 122 are provided to a coaxial line to be rotated by one motor (not shown in the drawing). Alternatively, the rotational shafts of the inlet and outlet fans 121 and 122 can be arbitrarily configured as well.

In the embodiment of the present invention, the inlet fan receiving portion 132a is provided over the outlet fan receiving portion 132b so that the inlet fan 121 can be provided over the outlet fan 122.

The outlet fan receiving portion 132b is configured to communicate with the first passage of the heat exchange unit 110, and the inlet fan receiving portion 132a is configured to communicate with the second passage.

For this, the boundary wall 137 is provided with a first communicating opening 137a allowing the outlet fan receiving portion 132b to communicate with the first passage of the heat exchange unit 110 and a second communicating opening 137b allowing the inlet fan receiving portion 132a to communicate with the second passage of the heat exchange unit 110.

Specifically, the first communicating opening 137a blows the indoor air from the outlet fan receiving chamber 132b to the heat exchange unit 110 received in the first chamber 131.

And, the second communicating opening 137b supplies the outdoor air discharged from the heat exchange unit 110 to the inlet fan receiving portion 132a.

For this, the first communicating opening 137a is configured to penetrate a lower part of one side of the boundary wall 137 and the second communicating opening 137b is configured to penetrate an upper part of the other side of the boundary wall 137.

A predetermined gap is formed between an upper side of the inlet fan receiving portion 132a and a ceiling of the second chamber 132 to provide a space 132c, which has a predetermined size, communicating with the second communicating opening 137b. And, an inlet fan intake portion 132d penetrating in the direction of the shaft of the inlet fan 121 is provided to a central part of an upper side of the inlet fan receiving portion 132a to suck air into the inlet fan 121.

The second intake port 134 is provided to a central part of a bottom of the outlet fan receiving portion 132b to penetrate in the shaft direction of the outlet fan 122, whereby the indoor air is sucked into the outlet fan 122.

To supply the outdoor air blown from the inlet fan receiving portion 132a to the indoor space, the inlet 135 is provided between the second intake port 134 and a rear side of the case 130, and more particularly, between the second intake port 134 and the rear side of the case 130 confronting the front side of the case 130 having the first intake port 133 and the outlet 136 formed thereon.

It is a matter of course that the second intake port 134 and the inlet 135 can be connected to the indoor space via a separate duct instead of being directly exposed to the indoor space.

Preferably, the ventilating apparatus 100 further includes a filter unit 140 that purifies air in a manner of filtering off particles included in the outdoor air introduced into the case 130 via the first intake port 133.

And, the filter unit 140 is preferably provided to an outdoor air sucking side of the second passage provided to the heat exchange unit 110, i.e., between the second passage and the first intake port 133. So, it is able to prevent dust from being accumulated within the heat exchange unit 110.

Moreover, by the filter unit 140, the outdoor air introduced into the heat exchange unit 110 can be evenly distributed instead of being concentrated on a portion of the second passage, whereby efficiency of heat exchange can be enhanced.

In the embodiment of the present invention, the filter unit 140 preferably includes a HEPA (high efficiency particulate arrestor) filter having excellent dust-collecting performance.

The HEPA filter is capable of removing 99.97% of particles of pollutants such as dust, bacteria and the like exceeding 0.3 µm.

Figure 6:
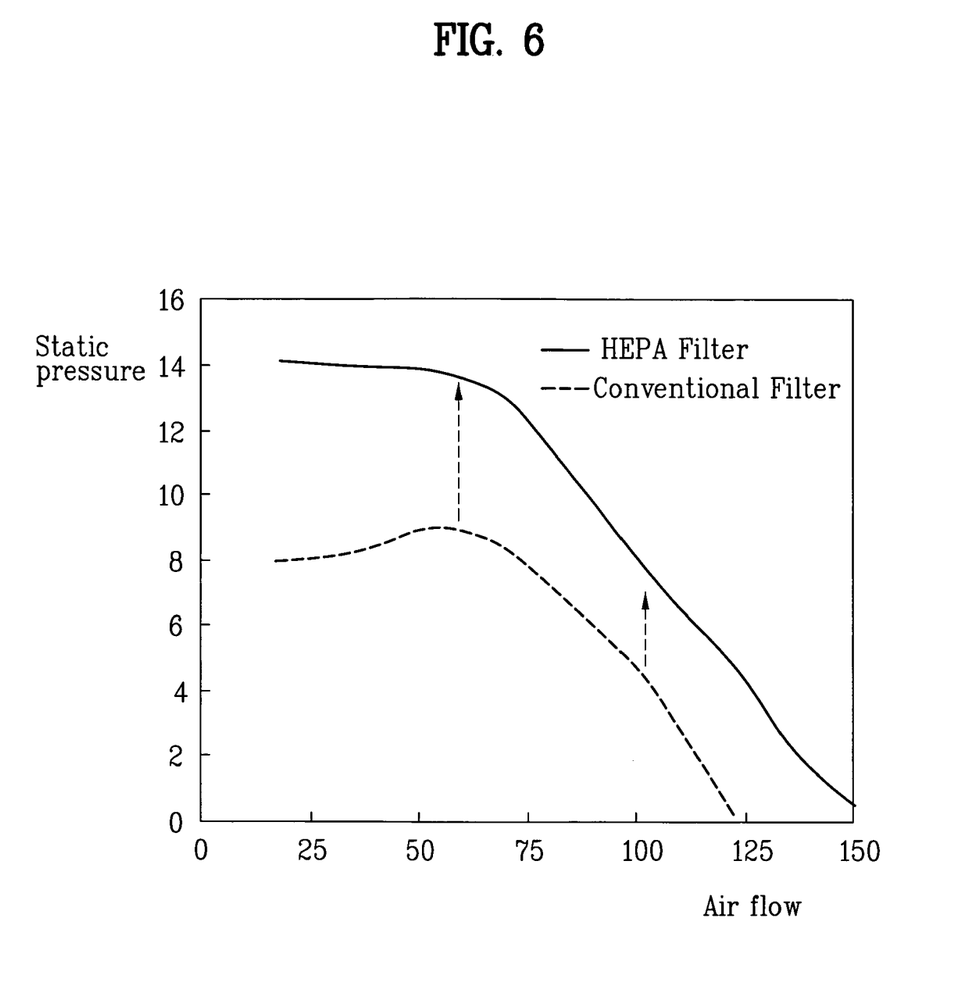
FIG. 6 is a graph between a static pressure and airflow in case of using a conventional filter or a HEPA filter.

Besides, in case of using the HEPA filter, a pressure loss is raised higher than that in using a conventional filter. Hence, a static pressure for a proper airflow, as shown in FIG. 6, is raised. Yet, such a problem can be solved by using the turbo fan.

Alternatively, it is a matter of course that an ULPA (ultra low penetration absolute) filter having filtering performance better than that of the HEPA filter can be used. The ULPA filter is capable of removing 99.999% of particles such as micro-dust of 0.1~0.01 µm, virus, fungus, pollen, Rd disintegration product, smoke and the like.

An operation of the above-configured ventilating apparatus according to the present invention is explained as follows.

First of all, once the motor for driving the inlet and outlet fans 121 and 122 is driven, the inlet and outlet fans 121 and 122 are rotated.

As the fans 121 and 122 are rotated, the outdoor air is introduced into the first chamber 131 via the first intake port 133, is purified via the filter unit 140, and then passes through the second passage.

Simultaneously, the indoor air introduced into the outlet fan receiving portion 132b via the second intake port 134 is blown to the first chamber via the first communicating opening 137a and then passes through the first passage.

In the above process, the indoor air discharged to the outdoor space via the first passage makes heat exchange with the outdoor air supplied to the indoor space via the second passage.

Namely, the outdoor air passing through the heat exchange unit 110 is cooled down when the indoor air attributed to the cooling is colder than the outdoor air in summer. Or, the outdoor air passing through the heat exchange unit 110 is heated when the indoor air attributed to the heating is hotter than the outdoor air in winter.

Hence, the outdoor air supplied to the indoor space recovers the heat of the indoor air discharged to the outdoor space and is then sucked into the inlet fan receiving portion 132a via the second communicating opening 137b and the inlet fan intake portion 132d.

Thereafter, the outdoor air blown by the inlet fan 121 in the radial direction is supplied to the indoor space via the inlet 135 while the indoor air discharged from the first passage is discharged to the outdoor space via the outlet. Thus, the room ventilation is performed.

Accordingly, the present invention provides the following effects or advantages.

First of all, in the ventilating apparatus according to the present invention, both of the heat exchange unit and the blower device are provided within one case to facilitate the installation of the ventilating apparatus of the present invention on the ceiling of a building and the like.

Secondly, the heat exchange unit and the blower device within the case are configured to minimize the thickness of the case, whereby the ceiling thickness for the installation of the ventilating apparatus is prevented from being raised and whereby a corresponding construction cost can be saved.

Thirdly, the ventilating apparatus according to the present invention is provided with the turbo fan, thereby reducing the case thickness, overcoming the increase of the flow resistance due to the installation of the HEPA filter, and set airflow.

Fourthly, in the ventilating apparatus according to the present invention, the filter unit is provided to the outdoor air sucking side of the heat exchange unit to prevent the dust from being accumulated within the heat exchange unit. And, the outdoor air introduced into the heat exchange unit is evenly distributed to enhance the efficiency of heat exchange.

Finally, in the ventilating apparatus according to the present invention, the HEPA filter is provided to the filter unit, whereby performance of filtering off the particles included in the air supplied to the indoor space can be enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A ventilating apparatus comprising:
a blower device having an inlet centrifugal fan supplying outdoor air to an indoor space and an outlet centrifugal fan discharging indoor air to an outdoor space;
a heat exchange unit performing heat exchange between outdoor air supplied to the indoor space and indoor air discharged to the outdoor space;
a case having a first chamber configured to receive the heat exchange unit and a second chamber configured to receive the blower device and to communicate with the first chamber;
a first passage through which indoor air discharged to the outdoor space passes; and
a second passage through which outdoor air supplied to the indoor space passes,
wherein the first passage and the second passage cross at the heat exchanging unit,
wherein one end of each of the first and second passages are positioned substantially aligned side by side in a sidewall of the first chamber in a direction transverse to a rotational axis of the inlet centrifugal fan, and the other end of the first passage is positioned in a lower portion of a boundary wall of the second chamber and the other end of the second passage is positioned in an upper portion of the boundary wall of the second chamber,
wherein the other end of the second passage is in communication with an axial portion of the inlet centrifugal fan and the other end of the first passage is in communication with a radial portion of the outlet centrifugal fan so that the heat exchange unit and the blower device within the case are configured to minimize the thickness of the case, and
wherein the case further comprises:
a first intake port provided at the one end of the second passage;
a second intake port through which indoor air is introduced;
an inlet for supplying outdoor air to the indoor space; and
an outlet for discharging indoor air provided at the one end of the first passage.

2. The ventilating apparatus of claim 1, wherein the first intake port and the outlet are configured to penetrate the sidewall of the first chamber and wherein the second intake port and the inlet are configured to penetrate a bottom of the second chamber.

3. The ventilating apparatus of claim 1, wherein the first and second chambers are partitioned from each other by a boundary wall traversing an inside of the case.

4. The ventilating apparatus of claim 1, wherein each of the inlet and outlet centrifugal fans rotate about a rotational shaft that extends perpendicular to a bottom of the case.

5. The ventilating apparatus of claim 4, wherein the rotational shafts of the inlet and outlet centrifugal fans are coaxially aligned and rotated by one motor.

6. The ventilating apparatus of claim 5, wherein the inlet centrifugal fan is positioned over the outlet centrifugal fan.

7. The ventilating apparatus of claim 1, wherein each of the inlet and outlet fans comprises a turbo fan.

8. A ventilating apparatus comprising:
   a blower device having an inlet centrifugal fan supplying outdoor air to an indoor space and an outlet centrifugal fan discharging indoor air to an outdoor space;
   a heat exchange unit performing heat exchange between outdoor air supplied to the indoor space and indoor air discharged to the outdoor space;
   a case having a first chamber configured to receive the heat exchange unit and a second chamber configured to receive the blower device and to communicate with the first chamber;
   a first passage through which indoor air discharged to the outdoor space passes; and
   a second passage through which outdoor air supplied to the indoor space passes,
   wherein the first passage and the second passage cross at the heat exchanging unit,
   wherein one end of each of the first and second passages are positioned substantially aligned side by side in a sidewall of the first chamber in a direction transverse to a rotational axis of the inlet centrifugal fan, and the other end of the first passage is positioned in a lower portion of a boundary wall of the second chamber and the other end of the second passage is positioned in an upper portion of the boundary wall of the second chamber,
   wherein the other end of the second passage is in communication with an axial portion of the inlet centrifugal fan and the other end of the first passage is in communication with a radial portion of the outlet centrifugal fan so that the heat exchange unit and the blower device within the case are configured to minimize the thickness of the case,
   wherein the second chamber comprises:
     an inlet fan receiving portion receiving the inlet centrifugal fan therein; and
     an outlet fan receiving portion receiving the outlet centrifugal fan therein; and
   wherein the boundary wall comprises:
     a first communicating opening for blowing indoor air from the outlet fan receiving portion to the heat exchange unit, and provided at the other end of the first passage; and
     a second communicating opening for drawing outdoor air into the inlet fan receiving portion from the heat exchange unit, and provided at the other end of the second passage.

9. The ventilating apparatus of claim 8, wherein the second passage being provided parallel to a bottom of the case, and the second passage guides air in a direction substantially traverse to an airflow direction of the first passage.

10. The ventilating apparatus of claim 9, further comprising a filter unit provided within the case to filter out particles in the outdoor air supplied to the indoor space.

11. The ventilating apparatus of claim 10, wherein the filter unit is provided at an intake side of the second passage.

12. The ventilating apparatus of claim 11, wherein the filter unit comprises a HEPA filter.

13. The ventilating apparatus of claim 9, wherein the inlet fan receiving portion is provided over the outlet fan receiving portion, the first communicating opening is provided at a lower part of one side of the boundary wall, and the second communicating opening is provided at an upper part of an other side of the boundary wall.

14. The ventilating apparatus of claim 13, wherein an inlet fan intake portion is provided at a central part of an upper side of the inlet fan receiving portion and the second intake port is provided at a central part of a bottom of the outlet fan receiving portion.

15. The ventilating apparatus of claim 14, wherein a space having a predetermined size is provided between the upper side of the inlet fan receiving portion and a ceiling of the second chamber to communicate with the second communicating opening.

* * * * *